No. 642,429. Patented Jan. 30, 1900.
A. T. COLLIER.
MEANS FOR SECURING PNEUMATIC TIRES ON WHEEL RIMS.
(Application filed June 5, 1899.)
(No Model.)

Witnesses

Inventor

UNITED STATES PATENT OFFICE.

ARTHUR T. COLLIER, OF ST. ALBANS, ENGLAND.

MEANS FOR SECURING PNEUMATIC TIRES ON WHEEL-RIMS.

SPECIFICATION forming part of Letters Patent No. 642,429, dated January 30, 1900.

Application filed June 5, 1899. Serial No. 719,471. (No model.)

*To all whom it may concern:*

Be it known that I, ARTHUR THOMAS COLLIER, engineer, a subject of the Queen of Great Britain, residing at Gonvena, St. Albans, England, have invented certain new and useful Improved Means for Securing Pneumatic Tires on Wheel-Rims, of which the following is a specification, reference being had to the accompanying drawings, in which—

Figure 1:
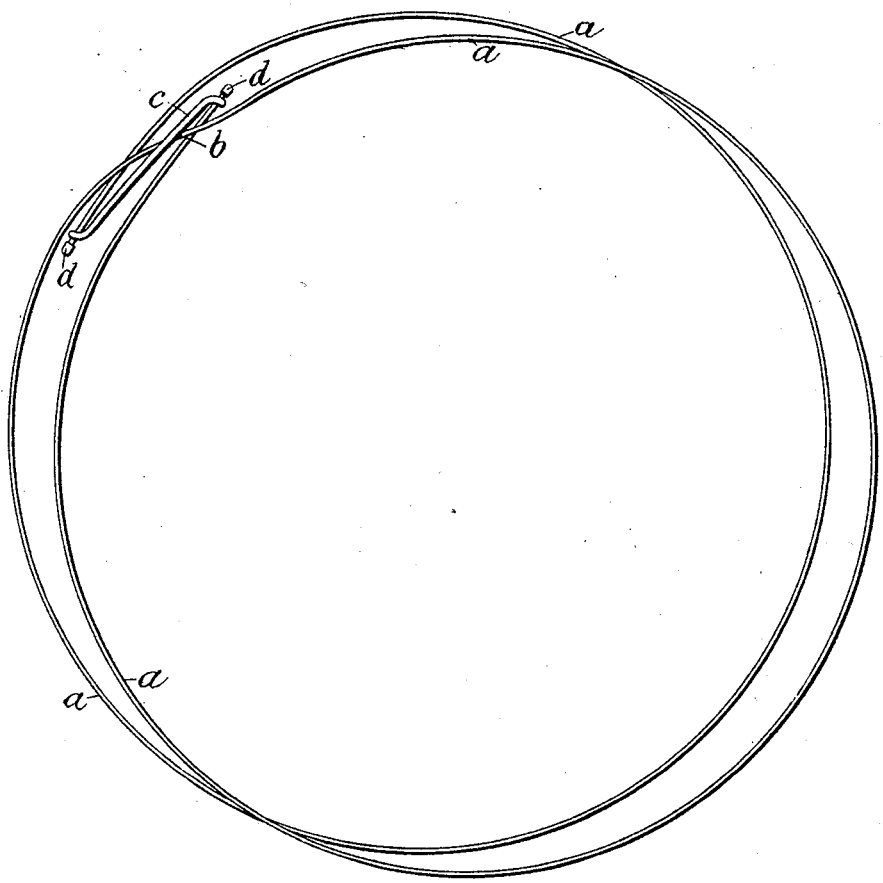
Figure 2:
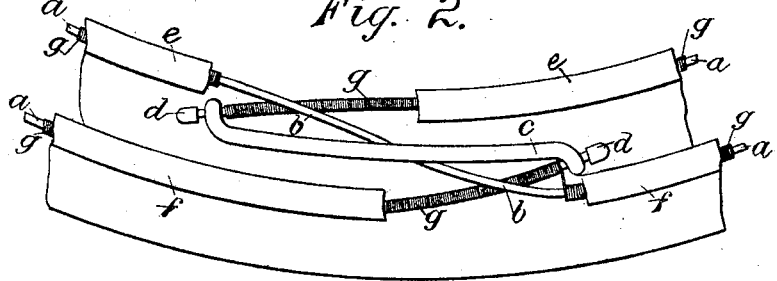

Figure 1 shows in perspective one form of my improved tire-fastening; and Fig. 2 shows in perspective, drawn to an enlarged scale, a portion of an outer cover or sheath provided with the said fastening.

My invention is designed to provide improved means for securing pneumatic tires on the wheels of velocipedes and other vehicles, and relates chiefly to tires of the kind or class in which one or more air-tubes are inclosed in an outer sheath or cover. My improvements are, however, also applicable to tires in which an air-tube and an elastic ring or cushion concentric therewith are inclosed in an outer sheath or cover and to tubeless tires.

By my said invention I provide for the fastening of the tire upon a wheel-rim as securely as is practicable with the two inextensible wires usually employed in the edges of the sheath or cover, while greatly facilitating the operations of putting on and taking off the tire and enabling these operations to be very readily performed without the aid of any tool or implement.

For securing upon a wheel-rim a tire having an outer sheath or cover I employ a single wire, wire rope, or cord, so arranged that it will securely retain both edges of the sheath or cover in position in the groove of the wheel-rim when the tire is inflated, but will permit the ready detachment of the tire when deflated. This wire or cord is passed or threaded through both of the tubes or passages extending around the edges of the sheath or cover, one or more turns or convolutions of the wire or cord being rove through each edge of the sheath or cover, the middle portion of the said wire or cord crossing over from one edge to the other and the ends of the said wire or cord protruding from the said tubes or passages and being connected, as hereinafter described. With a tire-fastening of this kind in removing the tire when deflated the portion of the wire or cord in either edge of the sheath can be easily extended sufficiently to allow it to be readily passed over the corresponding edge of the wheel-rim, the portion of the said wire or cord in the other edge being simultaneously contracted to a corresponding extent in the groove of the wheel-rim, and similarly in putting on the tire the two portions of the wire or cord can be alternately extended to permit of the edges of the sheath or cover being readily passed over one or the other edge of the wheel-rim.

I find it advantageous to connect the two ends of the wire or cord by overlapping the same and coupling them, respectively, to the ends of a bent or curved rod or strut which when the tire is in place on the wheel-rim will lie in the middle or lower part of the groove of the latter and will limit the approach of the ends of the said wire or cord toward each other when the tire is inflated. The ends of the wire or cord are, if desired, connected with this rod or strut in such a manner that one or both of them can be readily detached, thus permitting the complete removal of the inner air-tube from the sheath and its insertion therein. I sometimes pass each end of the wire through a hole in the said rod or strut and provide it with an enlargement or a nut or other suitable device to retain it therein, or I secure one end in this way and pass the other end into a slot in the said rod or strut, which slot may be closed, if desired, by means of a nut or a screw-cap or other suitable device.

Referring to Fig. 1 of the drawings, *a* is the fastening-wire, which, as shown, has two complete convolutions, one to extend through each of the tubes or passages at the edges of the tire or sheath. The wire at a point midway between its ends crosses obliquely from one convolution to the other, as at *b*, and its ends overlap each other and are passed through holes in the ends of a rod or strut *c* and are provided with knobs or enlargements *d*, so that they will be retained in the said holes. The said wire and strut together therefore form an endless band having two turns or convolutions, either of which can be extended at the expense of the other—that is to say, the circumference of either convolution can be enlarged or extended, while that of the other is correspondingly diminished or contracted.

In applying this fastening to a tire or to the sheath or cover of a tire I prefer to inclose in each of the tubes or passages e f, Fig. 2, formed along the edges of the sheath or tire, a closely-coiled spiral wire g, of brass or other suitable metal, preferably a metal that does not readily oxidize or rust under the influence of moisture. These closely-coiled spiral wires serve as flexible metal linings to the said tubes or passages e f, in which the wire a can slide freely during the extension and contraction of its convolutions when the tire is being put on or taken off the wheel-rim, the said metal linings not only diminishing the friction, but preventing adherence of the wire to the interior of the said tubes or passages. It is evident that with this mode of fastening, although either edge of the sheath or tire can be readily extended to allow it to pass over the edge of the wheel-rim, yet when the tire is in place the inflation of the same will cause equal extension of both edges thereof, the edge which may before the inflation be the more contracted being simply caused by the air-pressure to ride up the inclined side of the groove in the wheel-rim until the circumference of the convolution in this edge is equal to that of the convolution in the other edge. The tire can therefore be very readily put on the wheel-rim and is easily detachable, but when in place cannot be accidentally displaced or detached.

The rod or strut c (shown in the drawings) is bent or curved, so that when its ends bear against the opposite edges of the wheel-rim its main portion will lie along the middle of the groove in the said rim. One or both ends of the said rod or strut may, if desired, be made to fit into or extend through a hole in the wheel-rim and may, if desired, be secured therein by any convenient means.

With a fastening of this kind it is unnecessary to make the wheel-rim with a deep groove, such as is used to permit of the two inextensible wires ordinarily employed being alternately brought nearer to the hub of the wheel at one side (when putting on or detaching the tire) in order to allow them to be forced over the edge of the wheel-rim at the other side.

It will be seen that by causing the rod or strut c to inclose the part b of the wire a, which crosses over from one side or edge e of the sheath or cover to the other side or edge f in the angles which it forms with the end of the wire a at each side, as shown, the said cross-wire b balances the outward thrust produced by the pull of the ends of the wire a on the ends of the rod or strut c, and thus my improved fastening is adapted for use on slightly-grooved or even cylindrical rims.

In my improved device while the extensibility of the endless fastening wire or band as a whole is limited, so as to keep the edges of the sheath or cover within the wheel-rim when the tire is inflated, either portion of the said wire or band can, as above stated, be contracted by the extension of the other portion thereof when the tire is deflated.

In the case of tubeless tires I form the same with suitable tubes or passages to receive the said fastening wire or cord either with or without metal linings in the said tubes or passages.

What I claim is—

1. As a means for securing a tire on a wheel-rim, a wire or cord having two turns or convolutions, crossing obliquely at a point midway between its ends from one to the other of said convolutions and having its ends overlapping each other, and a rod or strut connected at its ends with the ends of said wire or cord respectively and extending obliquely across the wheel-rim so as to inclose the part of the wire which crosses over from one edge of the sheath or cover to the other, between it and the overlapping piece or end of the wire at each side, substantially as hereinbefore described.

2. The combination, in a tire, of a sheath or cover having tubes or passages extending along its edges, a wire or cord which extends through the said tubes or passages, crosses from one edge of the tire to the other and has its ends overlapping each other, and a bent or curved rod or strut extending obliquely across the wheel-rim and over the crossed-over part of the said wire, and having the ends of the said wire or cord attached to its ends, substantially as, and for the purposes, hereinbefore described.

3. The combination, with the sheath or cover of a tire having tubes or passages along its edges, of flexible metal linings in said tubes or passages, capable of extension and contraction, a wire or cord extending through both of said tubes or passages within the metal linings thereof, crossing from one to the other and having its ends overlapping each other, and a rod or strut extending obliquely across the wheel-rim and having the ends of the said wire or cord attached to its ends, substantially as, and for the purposes, hereinbefore described.

4. The combination, in a tire, of a sheath or cover having tubes or passages extending along its edges, a metal lining in each of said tubes or passages, consisting of a wire coiled in such a manner that it can be extended and contracted, a wire or cord extending through both of said tubes or passages within the metal linings thereof and crossing from one to the other and having its ends overlapping each other, and a rod or strut extending obliquely across the wheel-rim and having the ends of the said wire or cord attached to its ends, substantially as, and for the purposes above specified.

In testimony whereof I have hereunto set my hand in the presence of two subscribing witnesses.

ARTHUR T. COLLIER.

Witnesses:
DAVID YOUNG,
ALEXANDER W. ALLEN.